US006954426B2

(12) United States Patent
Suominen

(10) Patent No.: US 6,954,426 B2
(45) Date of Patent: Oct. 11, 2005

(54) METHOD AND SYSTEM FOR ROUTING IN AN ATM NETWORK

(75) Inventor: Jukka Suominen, Espoo (FI)

(73) Assignee: Nokia Corporation, Espoo (FI)

( * ) Notice: Subject to any disclaimer, the term of this patent is extended or adjusted under 35 U.S.C. 154(b) by 1018 days.

(21) Appl. No.: 09/728,615

(22) Filed: Nov. 30, 2000

(65) Prior Publication Data

US 2003/0002510 A1 Jan. 2, 2003

Related U.S. Application Data

(63) Continuation of application No. PCT/FI99/00469, filed on May 31, 1999.

(30) Foreign Application Priority Data

Jun. 5, 1998 (FI) ................................................ 981297

(51) Int. Cl.[7] ................................................ G01R 31/08

(52) U.S. Cl. .................... 370/230; 370/395.1; 370/398; 370/422

(58) Field of Search ............................. 370/230, 395.1, 370/398, 400, 422, 238.1, 238

(56) References Cited

U.S. PATENT DOCUMENTS 4,771,424 A * 9/1988 Suzuki et al. ............... 370/400
5,216,669 A 6/1993 Hofstetter et al.
5,381,404 A * 1/1995 Sugano et al. .............. 370/238
5,953,338 A * 9/1999 Ma et al. ............... 370/395.21
6,349,088 B1 * 2/2002 Ginzboorg et al. ......... 370/230
6,667,956 B2 * 12/2003 Beshai et al. ............... 370/238

FOREIGN PATENT DOCUMENTS

| | | |
|---|---|---|
| EP | 0 215 463 | 3/1987 |
| EP | 0 773 698 | 5/1997 |
| EP | 0 814 583 | 12/1997 |
| WO | WO 98/09407 | 3/1998 |

OTHER PUBLICATIONS

International Search Report for PCT/FI99/00469.

* cited by examiner

*Primary Examiner*—Ricky Ngo
*Assistant Examiner*—Nittaya Juntima
(74) *Attorney, Agent, or Firm*—Squire, Sanders & Dempsey L.L.P.

(57) ABSTRACT

A method and system for routing in an ATM network, which has a plurality of nodes connected to each other via links and a network management centre connected to the ATM network. The optimisation information is defined in a centralized manner in the network management centre and the nodes apply the results of this centralized optimisation according to their own condition. The optimisation information is defined so that sum of rejected capacity for each connection between an origin node and a terminal node does not exceed a predetermined limit. The invention provides the advantage that the operation of individual nodes in setting up connections is very fast. Moreover, a fair distribution of network resources among users is achieved.

8 Claims, 1 Drawing Sheet

METHOD AND SYSTEM FOR ROUTING IN AN ATM NETWORK

This application is a continuation of International application Ser. No. PCT/FI99/00469, filed May 31, 1999.

FIELD OF THE INVENTION

The present invention relates to a method for routing in an ATM network as defined in the preamble of claim 1 and to a system for routing in an ATM network as defined in the preamble of claim 7.

BACKGROUND OF THE INVENTION

In prior art, several routing methods used in ATM networks (Asynchronous Transfer Mode, ATM) are known, such as the PNNI standard (Private Network-Node Interface, PNNI) by ATM Forum and the method presented in patent publication EP 0 814 583A2. Prior-art methods can be divided into two groups. For example, the above-mentioned methods represent shortest-path routing methods, which are derived from the routing methods used in data networks. Their aim is to define the shortest route between two nodes, i.e. e.g. the route with the smallest delay. However, in ATM networks minimising the delay is not of such essential importance as in traditional data networks because the ATM service categories define the scope for the delay.

Another known group of routing methods are the methods based on LLR algorithms (Least Loaded Routing, LLR), which are used in the present-day telephone network. They involve the problem that a direct connection is assumed to exist between all nodes in the network. Moreover, they do not take into account the asymmetry, which is typical of ATM connections. In ATM connections, outgoing traffic is often only a fraction of incoming traffic.

Both methods have the drawback that demanding and time-consuming optimisation calculations have to be carried out in each node of the network. Therefore, the nodes need a large processing capacity and complex software. In addition, complete information about the condition of each link in the network has to be maintained in each node. Collecting this information and keeping it up to date requires a large volume of signalling traffic, thus wasting network resources.

BRIEF DESCRIPTION OF THE INVENTION

The object of the present invention is to disclose a new type of method and system to eliminate the drawbacks mentioned above.

A specific object of the present invention is to disclose a routing method and system in which optimal routes are determined in a centralised manner and the nodes apply the results of this centralised optimisation according to their own condition.

As for the features characteristic of the present invention, reference is made to the claims.

In the system of the invention for routing in an ATM network comprising a number of nodes connected to each other by links, a network management centre being connected to said ATM network, an ATM call is routed from a node acting as originating point to a node acting as terminal point. The ATM call is e.g. a voice call or a connection for transmitting data, video or equivalent. According to the invention, optimisation information is determined in a centralised manner e.g. in the network management centre. Optimisation information refers to optimal allocation among the routes available. This optimisation information is transferred to the nodes, which apply it in the routing in accordance with their own condition.

As compared with prior art, the present invention has the advantage that individual nodes can function very fast in setting up connections as they do not have to perform any complex optimisation calculations and they do not have to collect and maintain any status data regarding all other links in the network. Moreover, as all demanding functions are performed in a single centralised location, control is easier. Still, individual nodes work so independently that even if all the means used for optimisation should fail, the network would still continue functioning.

A further advantage of centralised optimisation is that the situation can be optimised with regard to the whole network by making use of an anticipated condition of the network as well. This makes it possible to avoid situations where an individual node could block the entire network, as is fully possible in prior-art methods. In addition, in the method of the invention, a connection request is rejected if a global optimisation result so demands. This allows a fair distribution Of network resources between users. Moreover, the method of the invention requires only small changes in existing nodes.

In an embodiment of the invention, the traffic in the network is divided into categories, the parameters for which are traffic matrix, symmetry matrix, service quality and the return for each connection, a connection being understood as an originating point—terminal point pair. The traffic matrix contains an estimate of the capacity required for the connections, and this is defined by the operator on the basis of experience. The symmetry matrix defines the ratio of incoming data to outgoing data. Optimisation aims at minimising the sum of rejected capacity for all traffic categories and all connections in each category, weighted by the returns obtained from the connections. Rejected capacity refers to the difference between requested and allocated capacity. Moreover, the capacity of the links of the network must not be exceeded.

In an embodiment of the invention, the optimisation information is so defined that the sum of rejected capacity for the connections in each traffic category does not exceed a predetermined limit for the category.

In an embodiment of the invention, the optimisation information is so defined that the rejected capacity for each connection does not exceed a predetermined limit.

In an embodiment of the invention, the nodes maintain statistics about the capacity required by the connection requests they receive. This statistical information is sent to the network management centre, and it is utilised in defining the optimisation information.

In the following, the invention will be described by the aid of a few examples of its embodiments with reference to the attached drawing, wherein

DETAILED DESCRIPTION OF THE INVENTION

Figure 1:
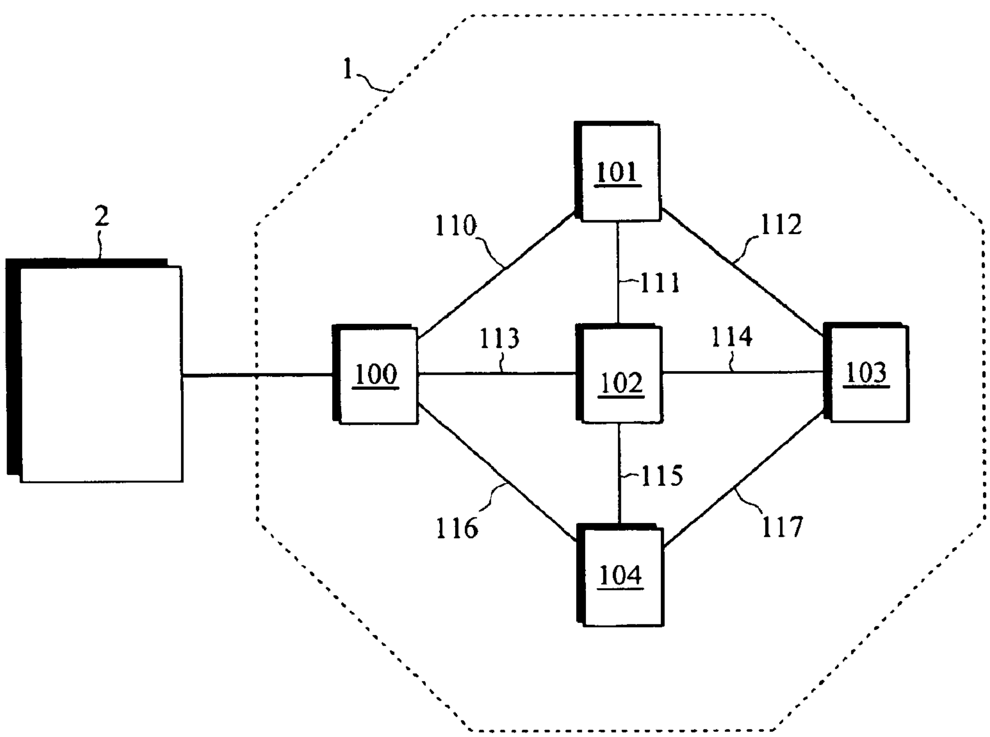
FIG. 1 presents an embodiment of the system of the invention.

In FIG. 1, an embodiment of the system of the invention is illustrated. An ATM network 1 and a network management centre 2 are connected together. The ATM network comprises a plurality of nodes 100–104, which are connected to each other via links 110–117. When an ATM call is to be started e.g. from node 100 to node 103, a procedure for determining an optimal route for the ATM call is activated. According to the invention, optimal routes are determined in a centralised manner in the network management centre 2, and the nodes 100–104 apply the results of this optimisation in accordance with their own condition. In addition, the nodes maintain statistics about the numbers of connection requests they receive, which are then transferred to the network management centre. This statistical information is utilised in the following optimisation calculations.

The optimisation aims at determining an optimal allocation of capacity among the routes available. The operator has the required information regarding network topology and the capacity of each link in the network. Moreover, traffic service categories K, the parameters of which are traffic matrix T, symmetry matrix S, service quality Q and the return R obtained from each connection, i.e. each origin—terminal pair, as well as the routes available for each service category have been defined. The optimisation can be expressed in a mathematical form e.g. as presented below. In solving the problem, it is possible to utilise e.g. a Simplex algorithm known in itself. The capacity required by the connection requests received by each node can be used to update an estimate of the traffic matrix.

$$\min \sum_{c} \sum_{\forall (s,d)} (r_{sd})^c (1 + s_{sd}) b_{sd} \text{ so that}$$

$$\begin{aligned}
&\sum_{k} (p_{sd}^k)^c = (t_{sd})^c - (b_{sd})^c && \forall (s,d), \forall c \\
&\sum_{(s,d),k,c} \left((a_{sd}^k)^{ij}\right)^c (p_{sd}^k)^c \le c^{ij} && \forall (i,j) \in A \\
&\sum_{(s,d)} (b_{sd})^c \le F \sum_{(s,d)} (t_{sd}) && \forall c \\
&(b_{sd})^c \le f_{sd} (t_{sd})^c && \forall (s,d), \forall c
\end{aligned},$$

where

Parameters:

N number of links

A number of links $T^c=\{(t_{sd})^c\}$ traffic matrix for category c $S^c=\{(s_{sd})^c\}$ symmetry matrix for category c $(r_{sd})^c$ return from connection s-d in category c $f_{sd}$ equity limit, i.e. upper limit for rejected load of individual connections F equity limit for category, i.e. upper limit for rejected load in each category $((a_{sd}^k)^{ij})^c$ link-path case parameter:

$$\left((a_{sd}^k)^{ij}\right)^c = \begin{cases} 1, \text{ if path } k \text{ for connection } s\text{-}d \text{ in category} \\ c \text{ uses link } (i, j) \\ S_{sd}, \text{ if path } k \text{ for connection } s\text{-}d \text{ in category} \\ c \text{ uses link } (j, i) \\ 0, \text{ otherwise} \end{cases}$$

Variables:

$(p_{sd}^k)^c$ capacity allocated forward rate connection s-d on path k in category c in forward direction $(b_{sd})^c$ rejected load for connection s-d in category c In other words, the aim is to minimise the sum of rejected capacity in each traffic category and for all connections in each category, weighted by the returns obtained from the connections. A further aim is to ensure that the sum of rejected capacity for the connections in each traffic category will not exceed a limit specified for the category, and that the rejected capacity for each connection will not exceed a predetermined limit. Furthermore, the capacity of the links in the network must not be exceeded.

The optimisation result is transferred to the nodes, which apply it in routing according to their own condition. Routing is effected e.g. according to the following algorithm.

Step 0: Reset status variables $r_i$ expressing the used-up proportion of the capacity for optimal route no. i to zero.

Step 1: In the case of an incoming ATM call, go on to step 2; at the end of an existing ATM call, go to step 4.

Step 2: Route the incoming ATM call via the path for which $p_i$-$r_i$ is maximised, where $p_i$ is the capacity allocated for path i during optimisation.

Step 3: If the ATM call is accepted, then add the capacity allocated for it to $r_i$ and go on to Step 1. Otherwise repeat Step 1 to find the next path. If all paths for an optimal solution have been tried, then block the incoming ATM call.

Step 4: Subtract the capacity allocated for the terminating call from $r_i$ and go on to Step 1.

Thus, a connection request is rejected if the global optimisation result requires rejection. This allows a fair distribution of network resources among the users.

The invention is not restricted to the examples of its embodiments described above, but many variations are possible within the scope of the inventive idea defined by the claims. For instance, the optimisation can be implemented using a non-linear target function.

What is claimed is:

1. Method for routing in an ATM network (1) comprising a plurality of nodes (100, 101, 102, 103) connected to each other via links (110–117), a network management centre (2) being connected to said ATM network (1), in which method an ATM call is routed from an originating node to a terminal node, characterised in that optimisation information is defined in a centralised manner in the network management centre (2);

the optimisation information is so defined that a sum of rejected capacity for each connection does not exceed a predetermined limit;

the optimisation information is transferred to the nodes (100, 101, 102, 103); and the ATM call is routed in the originating node using the optimisation information and local status information.

2. Method as defined in claim 1, characterised in that the optimisation information is so defined as to minimise a sum of rejected capacity for traffic categories and for connections in each category, said sum being weighted by returns obtained from the connections.

3. Method as defined in claim 1, characterised in that the optimisation information is so defined that a sum of rejected capacity for connections in each traffic category does not exceed a predetermined limit for the traffic category concerned.

4. Method as defined in claim 1, characterised in that the optimisation information is defined using a capacity required by connection requests received by the nodes.

5. System for routing in an ATM network (1) comprising a plurality of nodes (100, 101, 102, 103) connected to each other via links (110–117), a network management centre (2) being connected to said ATM network (1), in which system an ATM call is routed from an originating node to a terminal node, characterised in that the system comprises optimisation means in conjunction with the network management centre (2) for centralised definition of optimisation information;

the system comprises means for defining the optimisation information so that a sum of rejected capacity for each connection does not exceed a predetermined limit;

the system comprises means for transferring the optimisation information to the nodes (100, 101, 102, 103); and the system comprises means (100, 101, 102, 103) for routing the ATM call in the originating node using the optimisation information and local status information.

6. System as defined in claim 5, characterised in that the system comprises means for defining the optimisation information so as to minimise a sum of rejected capacity for traffic categories and connections in each category, said sum being weighted by returns obtained from the connections.

7. System as defined in claim 5, characterised in that the system comprises means for defining the optimisation information so that a sum of rejected capacity for connections in each traffic category does not exceed a predetermined limit for the traffic category concerned.

8. System as defined in claim 5, characterised in that the system comprises means for utilising the capacity required by connection requests received by the nodes (100, 101, 102, 103) in defining the optimisation information.

* * * * *